US008725728B1

(12) United States Patent
King et al.

(10) Patent No.: US 8,725,728 B1
(45) Date of Patent: May 13, 2014

(54) COMPUTER BASED METHOD AND SYSTEM OF GENERATING A VISUAL REPRESENTATION OF THE CHARACTER OF A USER OR BUSINESS BASED ON SELF-RATING AND INPUT FROM OTHER PARTIES

(75) Inventors: William R. King, East Amherst, NY (US); Michael A. Colgan, East Amherst, NY (US)

(73) Assignee: Michael A. Colgan, East Amherst, NY (US)

( * ) Notice: Subject to any disclaimer, the term of this patent is extended or adjusted under 35 U.S.C. 154(b) by 235 days.

(21) Appl. No.: 13/328,217

(22) Filed: Dec. 16, 2011

(51) Int. Cl.
*G06F 7/00* (2006.01)
*G06F 17/30* (2006.01)

(52) U.S. Cl.
CPC .... *G06F 17/30648* (2013.01); *G06F 17/30651* (2013.01); *G06F 17/30699* (2013.01)
USPC .......................................... 707/732; 707/738

(58) Field of Classification Search
CPC .................... G06F 17/30648; G06F 17/30651; G06F 17/30699
USPC ................................................. 707/732, 738
See application file for complete search history.

(56) References Cited

U.S. PATENT DOCUMENTS

| 5,652,842 | A | 7/1997 | Siegrist, Jr. et al. |
| 7,099,859 | B2 | 8/2006 | Sundaresan |
| 7,401,025 | B1 | 7/2008 | Lokitz |
| 7,509,230 | B2 | 3/2009 | Fernandez et al. |
| 7,552,063 | B1 | 6/2009 | McEachern |
| 7,599,935 | B2 * | 10/2009 | La Rotonda et al. ................. 1/1 |
| 7,930,304 | B1 * | 4/2011 | Rainwater et al. ............ 707/748 |
| 2002/0133365 | A1 | 9/2002 | Grey et al. |
| 2004/0044563 | A1 | 3/2004 | Stein |
| 2004/0103112 | A1 | 5/2004 | Colson et al. |
| 2005/0096922 | A1 | 5/2005 | Huberman et al. |
| 2006/0042483 | A1 | 3/2006 | Work et al. |
| 2007/0192130 | A1 | 8/2007 | Sandhu |
| 2008/0120411 | A1 | 5/2008 | Eberle |
| 2009/0150222 | A1 | 6/2009 | Polonsky |
| 2009/0171690 | A1 | 7/2009 | Lubarski et al. |
| 2009/0187988 | A1 | 7/2009 | Hulten et al. |
| 2009/0192812 | A1 | 7/2009 | Hurowitz |
| 2012/0185777 | A1 * | 7/2012 | Banerjee ........................ 715/738 |

FOREIGN PATENT DOCUMENTS

| JP | 2001268257 | 9/2001 |
| JP | 2001282940 | 10/2001 |
| WO | WO00/75851 | 12/2000 |
| WO | WO2005/013079 | 2/2005 |

* cited by examiner

*Primary Examiner* — Mariela Reyes
(74) *Attorney, Agent, or Firm* — Simpson & Simpson, PLLC

(57) ABSTRACT

A computer-based apparatus for compiling and evaluating character traits, including at least one processor for at least one specially programmed computer arranged to: transmit a plurality of queries regarding a plurality of character traits; receive a first response, from a first user, to the plurality of queries, including a respective first evaluation, by the first user, of the first user with respect to the character traits; generate, using the first response, a self-rating score regarding the character traits; transmit the queries to a second user; receive, from the second user a second response to the plurality of queries, the second response including a respective second evaluation, by the second user, of the first user with respect to said each character trait; generate, using the second response, an outside review score regarding the character traits; and transmit the self-rating score and the outside review score for display by at least one graphical user interface.

18 Claims, 11 Drawing Sheets

Annual SHOUT Review for Jen Baxter

Caveta, time to update your SHOUT for Jen Baxter. You may change the ratings in any categories you choose. And now that you have known Jen for 10 years – you and Jen have reached the Silver Level. Your SHOUT now has greater impact on Jen's SHOUT Score!

| SHOUT Categories | Character Trait Descriptions | Your Previous Ratings for Jen Baxter |
|---|---|---|
| Sociable: How friendly, kind, and cooperative is Jen with others? Is she helpful and courteous? | Friendly  Cooperative  Helpful  Courteous  Kind | 3 |
| Honest: What's Jen's personal level of integrity and truthfulness? Can she readily admit mistakes? | Has Integrity  Truthful  Sincere  Admits Mistakes  Principled | 5 |
| Optimistic: Does Jen have a positive attitude that encourages others and stays hopeful? Can she persevere and accomplish goals? | Positive Attitude  Encouraging  Hopeful  Perseverant  Can Do Attitude | 2 |
| Understanding: How well can Jen see another's viewpoint? Does she try to be fair and reasonable? | Perceptive  Fair  Empathetic  Reasonable  Professional | 3 |
| Trustworthy: How dependable, loyal, and conscientious is Jen? Is Jen a responsible person? | Dependable  Responsible  Loyal  Conscientious  Dedicated | 4 |

How To SHOUT an Annual Review Score

Your New SHOUT Score for Jen Baxter: 4, 5, 4, 4, 4, 21

Caveta Newly
Buffalo, NY
Silver SHOUT

COMPUTER BASED METHOD AND SYSTEM OF GENERATING A VISUAL REPRESENTATION OF THE CHARACTER OF A USER OR BUSINESS BASED ON SELF-RATING AND INPUT FROM OTHER PARTIES

TECHNICAL FIELD

The present disclosure relates to a computer-based systems and method for evaluating a person's character traits and providing data relating to a person's overall character for the purposes of understanding, evaluating, rating, managing, and applying character trait data in a variety of human social interactions.

BACKGROUND

Character can be defined as the qualities of a person's behavior. Character is often referred to in the context of positive or good qualities of behavior. Individuals, groups, organizations, communities, and cultures have always sought to understand and evaluate human character traits as a basis for human social interactions. The Internet provides an electronic medium of communication to which this fundamental human activity can be transferred to global audiences. However, there is no consistent semantically viable system architecture or evaluative process in which individuals can rate themselves and others against normative character traits. For example, a variety of methods of communication are available to individuals who wish to communicate their evaluation of another person or of the products of a business or their interactions with that business, but no consistent normative scale for a person's evaluation of the essential character of another person or business entity, an entity which is comprised of a variety of individual persons with varying character traits. Obstacles to effective and efficient character trait evaluations are many and include anonymous attacks, personality distortions, and resistance to negative feedback.

SUMMARY

According to aspects illustrated herein, there is provided a computer-based apparatus for compiling and evaluating character traits, including a processor for at least one specially programmed computer arranged to: transmit a plurality of queries regarding a plurality of character traits; receive a first response, from a first user, to the plurality of queries, the first response including a respective first evaluation, by the first user, of the first user with respect to each character trait in the plurality of character traits; generate, using the first response, a self-rating score including a respective first score for each character trait and a self-rating overall score representing all the character traits; transmit the plurality of queries to a second user other than the first user; receive, from the second user other than the first user, a second response to the plurality of queries, the second response including a respective second evaluation, by the second user, of the first user with respect to each character trait; generate, using the second response, an outside review score including a respective second score for each character trait, and an outside overall score representing all the character traits; and transmit the self-rating score and the outside review score for display by at least one graphical user interface.

According to aspects illustrated herein, there is provided a computer-based method for compiling and evaluating character traits, including: transmitting, using a processor for at least one specially programmed computer, a plurality of queries regarding a plurality of character traits; receiving, using the processor, a first response, from a first user, to the plurality of queries, the first response including a respective first evaluation, by the first user, of the first user with respect to each character trait in the plurality of character traits; generating, using the processor and the first response, a self-rating score including a respective first score for each character trait and a self-rating overall score representing all the character traits; transmitting, using the processor, the plurality of queries to a second user other than the first user; receiving, from the second user and using the processor, a second response to the plurality of queries, the second response including a respective second evaluation, by the second user, of the first user with respect to each character trait; generating, using the processor and the second response, an outside review score including a respective second score for each character trait, and an outside overall score representing all the character traits; transmitting, using the processor, the self-rating score and the outside review score; and displaying, using at least one graphical user interface, the self-rating score and the outside review score.

According to aspects illustrated herein, there is provided a computer-based method for compiling and evaluating character traits, including: transmitting, using at least one processor for at least one specially programmed computer, a plurality of queries regarding a plurality of character traits; receiving, using the at least one processor, a first response, from a first user, to the plurality of queries, the first response including a respective first evaluation, by the first user, of the first user with respect to each character trait in the plurality of character traits; generating, using the at least one processor and the first response, a self-rating score including a respective first score for said each character trait and a self-rating overall score representing all the character traits; transmitting, using the at least one processor, the self-rating score; displaying, using at least one graphical user interface, the self-rating score; receiving, using the at least one processor, a first relationship level selected by the first user from a plurality of relationship levels identifying respective lengths of acquaintance between the first user and a second user; transmitting, using the at least one processor, the plurality of queries and the plurality of relationship levels to a second user other than the first user; receiving, using the at least one processor and from the second user, a second response to the plurality of queries, the second response including a respective second evaluation, by the second user, of the first user with respect to said each character trait and a second relationship level selected by the second user from the plurality of relationship levels. The method including: generating, using the at least one processor and the second response, an outside review score including a respective second score for said each character trait, and an outside overall score representing all the character traits; weighting, using the at least one processor and the first or second selected relationship level, the outside review score; transmitting, using the at least one processor, the weighted outside review score for display by the at least one graphical user interface; receiving, using the at least one processor, a third response, after receiving the first response, from the first user to the plurality of queries, the third response including a respective third evaluation, by the first user, of the first user with respect to said each character trait; generating, using the at least one processor, an updated self-rating score by modifying the respective first scores or the self-rating score according to the third response; transmitting, using the at least one processor, the updated self-rating for display by the at least one graphical user interface; receiving, using the at least one processor and from a plurality of second users other than the first user, a plurality of second responses to the plurality of queries, each second response including a respective second evaluation, by a respective second user, of the first user with respect to said each character trait; generating, using the at least one processor and the plurality of second responses, a composite outside review score including a respective composite score for said each character trait, and a composite outside overall score representing all the character traits; transmitting, using the at least one processor, the composite outside review score for display by the at least one graphical user interface; selecting, using the at least one processor, a first number, from a first range of numbers, according to a number of responses in the plurality of second responses; selecting, using the at least one processor, a length of use time period for the first user, from a plurality of length of use time periods, based on a time duration since receipt of the first response; selecting, using the at least one processor, a second number associated with the selected length of use time period; providing, in response to input received from the first user and using the at least one processor, access to users other than the first user to the plurality of second responses, the access ranging from access to all the second responses to access to a limited number of the second responses; selecting, using the at least one processor, a third number according the access provided; generating, using the at least one processor, a surety score representing a confidence level in the composite outside review score by multiplying together the first, second, and third numbers; and transmitting, using the at least one processor, the surety score for display by the at least one graphical user interface.

BRIEF DESCRIPTION OF THE DRAWINGS

The nature and mode of operation of the present invention will now be more fully described in the following detailed description of the invention taken with the accompanying drawing figures, in which:

FIGS. 2-11 include screen captures illustrating a computer-based apparatus and method for compiling and evaluating character traits.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein shall include the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be understood that the use of "or" in the present application is with respect to a "non-exclusive" arrangement, unless stated otherwise. For example, when saying that "item x is A or B," it is understood that this can mean one of the following: 1) item x is only one or the other of A and B; and 2) item x is both A and B. Alternately stated, the word "or" is not used to define an "exclusive or" arrangement. For example, an "exclusive or" arrangement for the statement "item x is A or B" would require that x can be only one of A and B.

Figure 1:
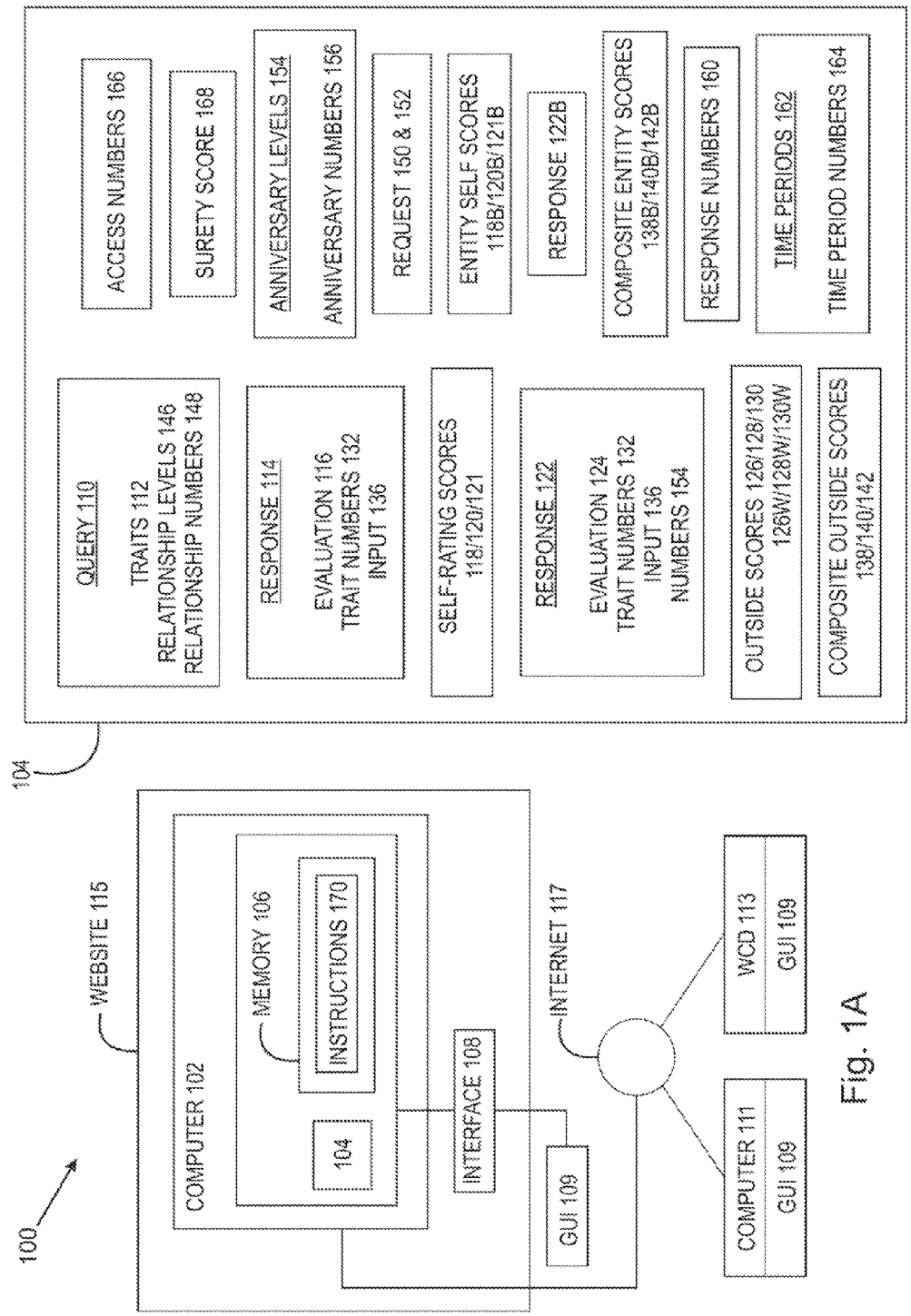
FIG. 1 is a block diagram for a computer-based apparatus for compiling and evaluating character traits.

FIG. 1 is a block diagram for computer-based apparatus 100 for compiling and evaluating character traits. Apparatus 100 includes at least one specially programmed computer 102 with at least one processor 104 and at least one memory element 106. Hereinafter, to simplify the presentation, the terms "processor" and "at least one processor" are used interchangeably. Interface element 108 is in communication with computer 102. The processor is arranged to transmit plurality of queries 110 regarding plurality of character traits 112 and receive a response 114, from a first user, to plurality of queries 110. Response 114 includes a respective evaluation 116, by the first user, of the first user with respect to each character trait in plurality of character traits 112. The processor is arranged to generate, using response 114, self-rating score 118 including respective scores 120 for each character trait and self-rating overall score 121 representing all the character traits. The processor is arranged to transmit, via the interface element, scores 118, 120, and 121 for display, for example, by at least one graphical user interface (GUI) 109.

Computer 102 can be any computer or plurality of computers known in the art. In one embodiment, the computer is located in a single location. In one embodiment, multiple computers 102 are located in different locations and are linked by any means known in the art. Processor 104 can be any processor known in the art. Memory element 106 can be any memory element known in the art. In an example embodiment, the memory element is separate from computer 102 and is linked to computer 102 by any means known in the art.

By interface element, we mean any combination of hardware, firmware, or software used to enable communication or data transfer between computer 102 and a device, system, or network external to computer 102. The interface element can connect with the device, system, or network external to computer 102, for example, 109, using any means known in the art, including, but not limited to a hardwire connection, an optical connection, an Internet connection, or a radio frequency connection. Interface element 108, and memory element 106 can be any interface element, or memory element, respectively, or combination thereof, known in the art. GUI 109 can be part of computer 102, different computers 111, or wireless communications device (WCD) 113. The different computer can be any computer known in the art. By WCD we mean a communications device that transmits and receives via a non-wired medium, such as radio frequency. A WCD can include, but is not limited to a television, cell phones, portable phones, and devices, such as laptop computers and PDAs interfaced with a wireless network, for example, a LAN. Applicable formats, standards or protocols, include Ethernet (or IEEE 802.3), SAP, ATP, Bluetooth, and TCP/IP, TDMA, CDMA, 3G and 4G.

In an example embodiment, computer 102 is hosted by website 115 and computer 111 or WCD 113 interface with website 115 via Internet 117. In an example, embodiment, some or all of the inputs received by the processor are stored in memory element 106.

The processor also is arranged to transmit queries 110 to a second user, different from the first user. The processor is arranged to receive response 122 to queries 110, including respective evaluations 124, by the second user, of the first user with respect to each character trait. The processor is further arranged to generate, using response 122, outside review score 126 including respective scores 128 for each character trait, and outside overall score 130 representing all the character traits. The processor is arranged to transmit the self-rating score and the outside review score for display, for example, by GUI 109.

In an example embodiment, the processor is arranged to receive updated response 114 from the first user to the plurality of queries, the response 114 including a respective updated evaluation 116, by the first user, of the first user with respect to each character trait. The processor also is arranged to generate an updated self-rating score by modifying scores 120 and 121 according to updated response 114. The processor is arranged to transmit updated self-rating score for display, for example, by GUI 109.

In an example embodiment, plurality of queries 110 includes respective ranges of numbers ranges 132 for each character trait in the plurality of character traits and responses 114 and 122 include, for each character trait, a respective selected number 132 from the range of numbers 132. In an example embodiment, responses 114 and 122 include input 136. In an example embodiment, the input is associated with one or more character traits from the plurality of character traits. In an example embodiment, the input is a textual comment. By "textual comment" we mean a written comment or other indicia. In an example embodiment, the input is audio, visual, or audio/visual. The processor is arranged to transmit numbers 132 and inputs 136 for response 114 for display, for example, by GUI 109.

In an example embodiment, the processor is arranged to transmit respective queries 110 to a plurality of second users, different from the first user, and to receive a plurality of responses 122 from the plurality of second users to the plurality of queries. The processor also is arranged to generate, using responses 122, composite outside review score 138 including respective composite score 140 for each character trait, and composite outside overall score 142 representing all the character traits. In an example embodiment, scores 126 for the plurality of responses 122 are weighted, as described below, to generate weighted outside review score 126W including respective weighted scores 128W for each character trait, and weighted outside overall score 130W. Scores 138, 140, and 142 are a mathematical representation, such as respective means or averages of a combination of respective scores 126, 128, and 130; or 126W, 128W, and 130W. For example, scores 138, 140, and 142 can be mathematical representatives of scores 126, 128, and 130, which are not weighted; or scores 138, 140, and 142 can be mathematical representatives of weighted scores 126W, 128W, and 130W. The processor is arranged to transmit scores 138, 140, and 142 for display, for example, by GUI 109. As additional responses 122 are received, the processor is arranged to update scores 138, 140, and 142 accordingly and to transmit updated scores 138, 140, and 142 for display, for example, by GUI 109.

In an example embodiment, query 110, transmitted to a second user, includes a level 146 selected by the first user from a plurality of relationship levels 146. A respective number 148 is associated with the selected level 146. The relationship levels identify a length of acquaintance between the first and second users. In an example embodiment, there is a plurality of relationship levels, for example, three relationship levels for: up to one year; one to three years; and more than three years. Weighting scores 126 includes multiplying respective numbers 132, described above, by number 148 associated with the selected relationship level. That is, generating outside review score 126W includes weighting, using the selected relationship level, score 126, for example, by multiplying respective numbers 132, described above, by number 148 associated with the selected relationship level.

In the present disclosure's recognition and construction of the temporal elements and processes inherent within socialized character reviews, the temporal length of an individual's social connection with another individual is a critical element in the design of the present disclosure's consistent semantically viable system architecture and evaluative functionality. Relationship levels and relationship anniversary levels are significant markers with specifically assigned proportional weight that increase the validity and reliability of each individual person's review of another person.

Longer temporal association with a person reflects stronger awareness of that person's essential character and enhances the procedural functionality of the present disclosure's consistent semantically viable system architecture. The ability of the present disclosure's users to periodically update the fluid efficacy of character traits, which are defined through and within the semantic distillation analysis process (a process that recognizes and accounts for innumerable cultural, semantic, linguistic, and psycholinguistic differentiations according to individualized epistemological interpretations) and socially exemplified by individual persons both in Self-Ratings (SR) and Invitee-Ratings (IR), further enhances the validity and reliability of the consistent semantically viable system architecture and evaluative functionality of the present disclosure.

In an example embodiment, the processor is arranged to transmit, after expiration of a time period from the receipt of response 122, respective requests 150 to the first and second users requesting the first or second users to select a relationship level from the plurality of relationship levels, different from relationship level 146, according to a change in the length of acquaintance between the first and second users, due to the expired time period. The processor is arranged to receive the different selected relationship level. That is, generating outside review score 126W includes multiplying score 126 by number 148 associated with the different selected relationship level, for example, by multiplying respective numbers 132, described above, by number 148 associated with the different selected relationship level.

In an example embodiment, there is a relationship level 146 associated with a length of acquaintance between the first and second user, for example, the third length of three plus years noted above. The processor is arranged to transmit, after expiration of a time period, for example one year, from the receipt of response 122, respective requests 152 to first and second users with the predetermined length of acquaintance. Requests 152 request the first or second users to select an anniversary level 154 from plurality of anniversary levels 154, if applicable. In an example embodiment, there is a plurality of anniversary levels, for example, four anniversary levels and progressively larger associated numbers 156: bronze (five to nine years); silver (10 to 19 years); gold (20 to 29 years); and platinum (30+ years). Generating outside review score 126W includes multiplying respective numbers 132, described above, by number 156 associated with the selected anniversary level.

Anniversary levels indicate a temporal length of acquaintance that enhances the credibility and insight of one person's procedural evaluation of another person within this fundamental human activity, especially into the efficacy levels of the socialized character traits which are defined through and within the semantic distillation analysis process and socially exemplified by individual persons, because socialized character traits can be fluid over time in which the efficacy of the traits increase, decrease, or remain static. Anniversary levels as temporal markers further enhance the validity and reliability of the consistent semantically viable system architecture and evaluative functionality of the present disclosure both in the construction and explication of normative character traits and in the comparative measurement against perfect trait scores.

In an example embodiment, the process of rating a person is applied to rating an organization, for example, a business. Persons associated with the organization are rated as described above to generate a rating for the organization. For example, query 110 is sent by the processor to one or more persons. The processor receives, from the one or more persons, a respective response 122 for at least one person associated with an organization. The processor is arranged to generate, using the respective responses 122, organization outside review score 138B including respective organization scores 140B for each character trait, and organization outside overall score 142B representing all the character traits. The processor is arranged to transmit score 138B for display, for example, by GUI 109. The weighting factors discussed above and below are applicable to score 138B.

In an example embodiment, the processor is arranged to select a number 160, from a range of numbers 160, according to a number of responses in the plurality of second responses. The processor also is arranged to: select length of use time period 162 for the first user, from a plurality of length of use time periods 162, based on a time duration since receipt of the first response; and select number 164 associated with the selected length of use time period.

The processor is further arranged to provide, in response to input received from the first user, access to users other than the first user to responses 122, the access ranging from access to all of responses 122, to access to a limited number of responses 122. The processor is arranged to select number 166 according the access provided, and generate surety score 168, representing a confidence level in self-rating score 118 and outside review score 126 or 138, by multiplying together numbers 160, 164, and 166. The processor is arranged to transmit surety score 168 for display, for example, by GUI 109.

In an example embodiment, processor 102 is arranged to transmit queries 110 in response to an identification of the second user or users by the first user.

The following provides further example detail and function of apparatus 100. Users, such as the first and second users noted above, access website 115. Computer-executable instructions 170, for example, in memory element 106, are executed by the processor to implement the operations described above and below. Users sign in and register at the website in order to use apparatus 100. Apparatus 100 presents the user with a welcome and brief descriptive overview of the process, which contains, for example, five steps. The program specifies that the user will be presented with character traits 112. In the discussion that follows, the traits are: Sociable, Honest, Optimistic, Understanding, and Trustworthy—with the acronym "SHOUT."

Through the process of "semantic distillation analysis" hundreds of different character traits are analyzed, distilled, and semantically parsed into five manageable and easy to comprehend categories of character traits. These five categories are essential and unique to the present disclosure because of the specific guidance that the categories provide to users in evaluating and determining a person's character both in ratings of self and of others. As mentioned in the Background, evaluating another person's character is a fundamental human activity that provides a basis for human social interactions, but it is one that is specific to the individual epistemological perspective and reality of each person. The present disclosure constructs a manageable process of character evaluation to which each person can participate according to a consistent semantically viable system architecture of character traits. The architecture of this semantically distilled set of character traits alters the epistemological perspective of and reality of the traits themselves by individual persons and users to fit within specific mutual parameters. These traits can be generalized to diverse populations of humans while still remaining valid and reliable to individual persons and users despite innumerable cultural, semantic, linguistic, and psycholinguistic differentiations which can vary according to a person's individualized epistemological interpretations.

Because humans create meaning in and through their communication, the definitions of words and the semantic explications of concepts, sometimes reflected in the vernacular, may evolve over time. Accordingly, a word or phrase within the list of descriptions constructed through the semantic distillation analysis process may also evolve over time and possibly shift in meaning. This fluidity of meaning is reflected and integrated as flexibility within the system that recognizes the natural and systemic cultural, epistemological, linguistic, psycholinguistic, semantic, and societal evolutions that can occur within, and as part of, a fundamental human activity, and that may influence and adapt details of the consistent semantically viable system architecture of the invention.

Additionally, because character traits incorporate qualities of mind and qualities of behavior, individual or group perception of the intellectual or behavioral qualities of descriptive traits can vary. Accordingly, while the following descriptions guide and structure the procedural functionality of the system for the user, divergent individual or group agreement with descriptive categorizations is recognized and incorporated into the system, and is considered to remain fluid and flexible within, and as part of, the consistent semantically viable system architecture of the invention.

The value-based technological communicative interaction described above between and among persons creates a new communications paradigm called "value networking." Value networking is electronic communications and interactions that build and reflect human relationships based on assessment and understanding of shared values.

The following provides further example details of possible operation of apparatus 100. In the description that follows, the operation of apparatus 100 is synonymous with "the program."

Process SR:

The program requires the first user to complete a Self-Rated (SR) character evaluation of self (response 114) as follows:

Process SR-01:

The program presents the first user with the first character trait (traits 112 and query 110): Sociable. The program semantically parses and defines "Sociable" with the following five human character traits: "friendly, cooperative, helpful, courteous, and kind" The program utilizes these 5 descriptive words to define the character trait category and offers possible means of analysis that include assigning a measure of 0 to 1 to each descriptive word or assigning a measure of 0 to 5 for the whole category. The measures for this SR process and the SR processes below are analogous to numbers 132. Because the program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the person should that person choose to utilize this descriptive list. The program instructs the first user to consider how "sociable" they are themselves. The program prompts the first user to consider questions such as: "How cooperative am I when I work on a project with others? What is my level of friendliness exhibited towards others? Am I helpful in my attitude and in my behavior towards others? Do I behave with courtesy and kindness? Do I respect people regardless of their social standing, ethnicity, or culture?" The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Sociable" character trait and 5.0 is the highest quantitative rating for the "Sociable" character trait. The program instructs the first user to select one of the measures on this quantitative scale that most accurately represents their own assessment of their own quality of being "Sociable." The program then takes the SR data input (part of response 114), quantifies data in relation to a perfect 5.0 rating for "Sociable," and stores the SR data input as a benchmark variable against which continuing Perfect 5.0 (P5), Invitee-Rated (IR) data sets (responses 122) and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured through applied mathematical correlation equations. In this example, and the SR processes described below, storage is in memory element 106.

Process SR-02:

The program presents the first user with the second character trait (traits 112 and query 110): Honest. The program semantically parses and defines "Honest" with the following five human character traits: "has integrity, truthful, sincere, admits mistakes, and principled." The program utilizes these 5 descriptive terms to define the character trait category and offers possible means of analysis that include assigning a measure of 0 to 1 to each descriptive term or assigning a measure of 0 to 5 for the whole category. Because this program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the first user should that first user choose to utilize this descriptive list. The program instructs the first user to consider how "honest" they are themselves. The program prompts the first user to consider questions such as: "How much integrity do I have when dealing with others and making decisions? What is my level of truthfulness? How sincere am I when I interact with another person? Do I admit my mistakes? Do I follow my core principles and values? The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Honest" character trait and 5.0 is the highest quantitative rating for the "Honest" character trait. The program instructs the first user to select one of the measures on this quantitative scale that most accurately represents their own assessment of their own quality of being "Honest." The program then takes the SR data input (response 114), quantifies the data in relation to a perfect 5.0 rating for "Honest," and stores the SR data input as a benchmark variable against which continuing Perfect 5.0 (P5), Invitee-Rated (IR) data sets (responses 122) and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured through applied mathematical correlation equations.

Process SR-03:

The program presents the first user with the third character trait (traits 112 and query 110): Optimistic. The program semantically parses and defines "Optimistic" with the following five human character traits: "positive attitude, encouraging, hopeful, perseverant, and can do attitude." The program utilizes these 5 descriptive terms to define the character trait category and offers possible means of analysis that include assigning a measure of 0 to 1 to each descriptive term or assigning a measure of 0 to 5 for the whole category. Because this program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the first user should that first user choose to utilize this descriptive list. The program instructs the first user to consider how "optimistic" they are themselves. The program prompts the first user to consider questions such as: "Do I generally behave with a positive attitude? Do I like to encourage people to do well? Am I more hopeful or pessimistic about tasks? When faced with a challenge do I adopt a can do attitude and persevere through the obstacles? Do I approach tasks with determination? The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Optimistic" character trait and 5.0 is the highest quantitative rating for the "Optimistic" character trait. The program instructs the first user to select one of the measures on this quantitative scale that most accurately represents their own assessment of their own quality of being "Optimistic." The program then takes the SR data input (response 114), quantifies it in relation to a perfect 5.0 rating for "Optimistic," and stores the SR data input as a benchmark variable against which continuing Perfect 5.0 (P5), Invitee-Rated (IR) data sets (responses 122) and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured through applied mathematical correlation equations.

Process SR-04:

The program presents the first user with the fourth character trait (traits 112 and query 110): Understanding. The program semantically parses and defines "Understanding" with the following five human character traits: "perceptive, fair, empathetic, reasonable, and professional." The program utilizes these 5 descriptive words to define the character trait category and offers possible means of analysis that include assigning a measure of 0 to 1 to each descriptive word or assigning a measure of 0 to 5 for the whole category. Because this program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the first user should that first user choose to utilize this descriptive list. The program instructs the first user to consider how "understanding" they are themselves. The program prompts the first user to consider questions such as: "How well can I perceive another person's point of view? Do I behave fairly with others? When confronted with an issue, how well do I exercise empathy by putting myself in the other person's shoes? Am I generally reasonable in my actions? What is my level of professionalism?" The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Understanding" character trait and 5.0 is the highest quantitative rating for the "Understanding" character trait. The program instructs the first user to select one of the measures on this quantitative scale that most accurately represents their own assessment of their own quality of being "Understanding." The program then takes the SR data input (response 114), quantifies it in relation to a perfect 5.0 rating for "Understanding," and stores the SR data input as a benchmark variable against which continuing Perfect 5.0 (P5), Invitee-Rated (IR) data sets (responses 122) and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured through applied mathematical correlation equations.

Process SR-05:

The program presents the first user with the fifth character trait (traits 112 and query 110): Trustworthy. The program semantically parses and defines "Trustworthy" with the following five human character traits: "dependable, responsible, loyal, conscientious, and dedicated. The program utilizes these 5 descriptive words to define the character trait category and offers possible means of analysis that include assigning a measure of 0 to 1 to each descriptive word or assigning a measure of 0 to 5 for the whole category. Because this program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the first user should that first user choose to utilize this descriptive list. The program instructs the first user to consider how "Trustworthy" they are themselves. The program prompts the first user to consider questions such as: "Can others depend on me to complete a task or keep a promise? Do I take responsibility for my actions? How loyal am I to other people? What is the level of care I take when engaging in my work? How dedicated am I to the things and people that are important to me?" The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Trustworthy" character trait and 5.0 is the highest quantitative rating for the "Trustworthy" character trait. The program instructs the first user to select one of the measures on this quantitative scale that most accurately represents their own assessment of their own quality of being "Trustworthy." The program then takes the SR data input (response 114), quantifies it in relation to a perfect 5.0 rating for "Trustworthy," and stores the SR data input as a benchmark variable against which continuing Perfect 5.0 (P5), Invitee-Rated (IR) data sets (responses 122) and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured through applied mathematical correlation equations.

The following is with respect to score 118:

Process SR-06:

To determine, define, and describe the SHOUT score (score 118), the program collates, parses, and stores all 5 levels of the SR data input (response 114). The program measures the overall quantitative data against the Perfect 5.0 (P5) benchmark as well as any previous SR data sets and Invitee-Rated (IR) data sets (responses 122). The program stores SR data for continuing correlation with future SR data input. The program parses and stores SR data according to the 5 categories, as well as Relationship Level (RL) variables (level 146), Length of Use (LU) variables (time periods 162), and Publication—Open Book/Half Book/Closed Book (OB/HB/CB) variables (166 described below). These variables are further described above and below.

Once the SR Process is completed, the program presents the first user with multiple options that include allowing the first user to invite other persons (transmitting queries 110 to the second and third users) to rate the first user on the identical 5.0 semantically parsed ratings scale (responses 114), or to respond to an invitation from another person (supply response 114) to rate that other person on the identical 5.0 semantically parsed ratings scale, or to access other variable data sets and aggregates of the first user's choosing for the purposes of obtaining information about, evaluating, rating, managing, understanding, and/or applying character trait data about themselves, others, or business aggregates.

Process RL:

The program presents the first user with the Ratings Process Variable called Relationship Level (level 146: RL). This variable is according to a length of acquaintance between the first user causing query 110 to be sent and the second user supplying response 114. In an example embodiment, the program offers a plurality of choices, for example, three lengths of acquaintance choices. This RL variable impacts the second user's rating score (score 126W) on three different proportion levels depending on the length of acquaintance between the first and second user according to an RL time variable.

Process RL-01:

The program presents the first user with Relationship Level 01 (RL-01), which is a length of acquaintance of less than 1 year. RL-01 indicates a "low casual level" relationship. The program instructs the first user to consider the level of relationship with second user with descriptive prompts such as "new business colleague, new customer, less than 1 year teacher-student acquaintance, new friend, recent in-law" according to the first and second users being acquainted for less than 1 year.

In an example embodiment, the program weights the RL-01 variable (numerical value 148) for a predetermined time period after submission and integrates this proportion into SHOUT score 126 for the person being evaluated. After a predetermined time period, the program sends a contact reminder (request 150) to the person supplying response 114 and the person being evaluated with options to upgrade the variable to RL-02, if applicable, or withdraw the rating. If there is No Response (NR) from the person supplying response 114 or the person being evaluated within a predetermined time period, the program places the RL variable and its associated SHOUT score 126 into a Permanent RL-01 (PRL-01) category and maintains the proportional weight and SHOUT score 126 indefinitely.

Process RL-02:

The program presents the first user with Relationship Level 02 (RL-02), which is a length of acquaintance of 1 to 3 years. RL-02 indicates a "medium" relationship. The program instructs the first user to consider the level of relationship with the second user with descriptive prompts such as "1 to 3 year business colleague, repeat customer, 1 to 3 year teacher-student acquaintance, deeper interpersonal friend, longer known in-law" according to the first and second users being acquainted for a period of 1 to 3 years.

In an example embodiment, the program weights the RL-02 variable (numerical value 148) for a predetermined time period after submission and integrates this proportion into the SHOUT score 126 for the person being evaluated. After a predetermined time period, the program sends a contact reminder (request 150) to the person supplying response 114 and the person being evaluated with options to upgrade the variable to RL-03, if applicable, or withdraw the rating. If there is No Response (NR) from the person supplying response 114 or the person being evaluated within a predetermined time period, the program places the RL variable and its associated SHOUT score 126 into a Permanent RL-02 (PRL-02) category and maintains the proportional weight and SHOUT score 126 indefinitely.

Process RL-03:

The program presents the first user with Relationship Level 03 (RL-03), which is a length of acquaintance of more than 3 years. RL-03 indicates a "strong" relationship. The program instructs the first user to consider the level of relationship with the second user with descriptive prompts such as "longtime business colleague, loyal customer, multiple year teacher-student acquaintance, very close interpersonal friend, well known in-law" according to the first and second users being acquainted for a period of more than 3 years.

In an example embodiment, the program weights the RL-03 variable (numerical value 148) for a predetermined time period after submission and integrates this proportion into the SHOUT score 126 for the user being evaluated. After a predetermined time period, the program sends a contact reminder (request 152) to the person supplying response 114 and the person being evaluated with options to upgrade the RL-03 variable to RL-UP Bronze (5-9 years), Silver (10-19 years), Gold (20-29 years), or Platinum (30+ years), if applicable (number 156), or withdraw the rating. If there is No Response (NR) from the person supplying response 114 or the person being evaluated within a predetermined time period, the program places the RL variable and its associated SHOUT score 126 into a Permanent RL-03 (PRL-03) category and maintains the proportional weight and SHOUT score 126 indefinitely.

RL Conflict:

In an example embodiment, in the event of Relationship Level conflicts between the person supplying response 114 and the person being evaluated, the RL is resolved by: mutual agreement between the person supplying response 114 and the person being evaluated or assigning the percentage weight according to the lowest level of disparity.

Invitee Rating Process:

In an example embodiment, in response to query 110, the person to supply response 114 accesses website 115 which houses the system program. The person to supply response 114 signs in and registers at the site in order to use the program. The program presents the person to supply response 114 with query 110 including a welcome and brief descriptive overview of the process, which contains 5 steps described below. The program specifies that the person to supply response 114 is presented with 5 character trait categories, for example, the traits described above: Sociable, Honest, Optimistic, Understanding, and Trustworthy—with the acronym "SHOUT."

Process IR:

The program invites the person to supply response 114 (query 110) to complete an Invitee-Rated (IR) character evaluation of the person being evaluated as follows:

Process IR-01:

The program presents the person supplying response 114 (Invitee-User) with the first character trait (traits 112 and query 110): Sociable. The program semantically parses and defines "Sociable" with the following five human character traits: "friendly, cooperative, helpful, courteous, and kind" The program utilizes these 5 descriptive words to define the character trait category and offers possible means of analysis that include assigning a measure of 0 to 1 to each descriptive word or assigning a measure of 0 to 5 for the whole category. The measures for this IR process and the IR processes below are analogous to numbers 132. Because this program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the Invitee-User should that person choose to utilize this descriptive list. The program instructs the Invitee-User to consider how "sociable" the person being evaluated (the Inviter) is. The program prompts the person supplying response 114 to consider questions such as: "How cooperative is the Inviter when they work on a project with others? What is the level of friendliness that the Inviter exhibits towards others? Is the Inviter helpful? Does the Inviter behave with courtesy and kindness? Does the Inviter respect people regardless of their social standing, ethnicity, or culture?" The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Sociable" character trait and 5.0 is the highest quantitative rating for the "Sociable" character trait. The program instructs the Invitee-User to select one of the measures on this quantitative scale that most accurately represents their assessment of the Inviter's quality of being "Sociable." The program then takes the IR data input (response 122) about the Inviter, quantifies it in relation to a perfect 5.0 rating for "Sociable," and stores the IR data input as a benchmark variable against which continuing Perfect 5.0 (P5), Self-Rated (SR) data sets (responses 114), other Invitee-Rated (IR) data sets (responses 122), and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured about the Inviter through applied mathematical correlation equations.

Process IR-02:

The program presents the Invitee with the second character trait (traits 112 and query 110): Honest. The program semantically parses and defines "Honest" with the following five human character traits: "has integrity, truthful, sincere, admits mistakes, and principled." The program utilizes these 5 descriptive terms to define the character trait category and offers possible means of analysis that include assigning a measure of 0 to 1 to each descriptive term or assigning a measure of 0 to 5 for the whole category. Because this program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the Invitee-User should that person choose to utilize this descriptive list. The program instructs the Invitee-User to consider how "honest" the Inviter is. The program prompts the Invitee-User to consider questions such as: "How much integrity does the Inviter have when dealing with others and making decisions? What is the Inviter's level of truthfulness? How sincere is the Inviter when they interact with another person? Does the Inviter admit mistakes? Does the Inviter seem to follow their core principles and values? The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Honest" character trait and 5.0 is the highest quantitative rating for the "Honest" character trait. The program instructs the Invitee-User to select one of the measures on this quantitative scale that most accurately represents their assessment of the Inviter's quality of being "Honest." The program then takes the IR data input (response 122), quantifies it in relation to a perfect 5.0 rating for "Honest," and stores the IR data input as a benchmark variable against which continuing Perfect 5.0 (P5), Self-Rated (SR) data sets (responses 114), other Invitee-Rated (IR) data sets (responses 122), and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured about the Inviter through applied mathematical correlation equations.

Process IR-03:

The program presents the Invitee with the third character trait (traits 112 and query 110): Optimistic. The program semantically parses and defines "Optimistic" with the following five human character traits: "positive attitude, encouraging, hopeful, perseverant, and can do attitude." The program utilizes these 5 descriptive terms to define the character trait category and offers possible means of analysis that include assigning a measure of 0 to 1 to each descriptive term or assigning a measure of 0 to 5 for the whole category. Because this program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the Invitee-User should that person choose to utilize this descriptive list. The program instructs the Invitee-User to consider how "optimistic" the Inviter is. The program prompts the Invitee-User to consider questions such as: "Does the Inviter generally behave with a positive attitude? Does the Inviter encourage people to do well? Is the Inviter more hopeful or pessimistic about tasks? When faced with a challenge does the Inviter adopt a can do attitude and persevere through the obstacles? Does the Inviter approach tasks with determination?" The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Optimistic" character trait and 5.0 is the highest quantitative rating for the "Optimistic" character trait. The program instructs the Invitee-User to select one of the measures on this quantitative scale that most accurately represents their assessment of the Inviter's quality of being "Optimistic." The program then takes the IR data input (response 122), quantifies it in relation to a perfect 5.0 rating for "Optimistic," and stores the IR data input as a benchmark variable against which continuing Perfect 5.0 (P5), Self-Rated (SR) data sets (responses 114), other Invitee-Rated (IR) data sets (responses 122), and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured about the Inviter through applied mathematical correlation equations.

Process IR-04:

The program presents the Invitee with the fourth character trait (traits 112 and query 110): Understanding. The program semantically parses and defines "Understanding" with the following five human character traits: "perceptive, fair, empathetic, reasonable, and professional." The program utilizes these 5 descriptive words to define the character trait category and offers possible means of analysis that include assigning a measure of 0 to 1 to each descriptive word or assigning a measure of 0 to 5 for the whole category. Because this program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the Invitee-User should that person choose to utilize this descriptive list. The program instructs the Invitee-User to consider how "understanding" the Inviter is. The program prompts the Invitee-User to consider questions such as: "How well does the Inviter perceive another person's point of view? Do they behave fairly with others? When confronted with an issue, how well does the Inviter exercise empathy by putting themselves in the other person's shoes? Is the Inviter generally reasonable in their actions? What is the Inviter's level of professionalism?" The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Understanding" character trait and 5.0 is the highest quantitative rating for the "Understanding" character trait. The program instructs the Invitee-User to select one of the measures on this quantitative scale that most accurately represents their assessment of the Inviter's quality of being "Understanding." The program then takes the IR data input (response 122), quantifies it in relation to a perfect 5.0 rating for "Understanding," and stores the IR data input as a benchmark variable against which continuing Perfect 5.0 (P5), Self-Rated (SR) data sets (responses 114), other Invitee-Rated (IR) data sets (responses 122), and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured about the Inviter through applied mathematical correlation equations.

Process IR-05:

The program presents the Invitee with the fifth character trait (traits 112 and query 110): Trustworthy. The program semantically parses and defines "Trustworthy" with the following five human character traits: "dependable, responsible, loyal, conscientious, and dedicated." The program utilizes these 5 descriptive words to define the character trait category and offers possible means of analysis that include assigning a measure of 0 to 1 to each descriptive word or assigning a measure of 0 to 5 for the whole category. Because this program recognizes and accounts for innumerable cultural, semantic, linguistic, and psycholinguistic differentiations according to individualized epistemological interpretations, a more extensive and exhaustive list of descriptive meanings for each of the five categories of human character traits is made available for the Invitee-User should that person choose to utilize this descriptive list. The program instructs the Invitee-User to consider how "Trustworthy" the Inviter is. The program prompts the Invitee-User to consider questions such as: "Can others depend on the Inviter to complete a task or keep a promise? Does the Inviter take responsibility for their actions? How loyal is the Inviter to other people? What is the level of care the Inviter takes when engaging in their work? How dedicated is the Inviter to the things and people that are important to them?" The program presents a quantitative scale of 0.0, 0.5, 1.0, 1.5, 2.0, 2.5, 3.0, 3.5, 4.0, 4.5, and 5.0 and indicates that 0.0 is the lowest quantitative rating for the "Trustworthy" character trait and 5.0 is the highest quantitative rating for the "Trustworthy" character trait. The program instructs the Invitee-User to select one of the measures on this quantitative scale that most accurately represents their assessment of the Inviter's quality of being "Trustworthy." The program then takes the IR data input (response 122), quantifies it in relation to a perfect 5.0 rating for "Trustworthy," and stores the IR data input as a benchmark variable against which continuing Perfect 5.0 (P5), Self-Rated (SR) data sets (responses 114), other Invitee-Rated (IR) data sets (responses 122), and other variable data sets, for example, Relationship Level (RL) variables (level 146), Length of Use (LU) variables (time periods 162), and Publication—Open Book/Half Book/Closed Book (OB/HB/CB) variables (166 described below), are consistently measured about the Inviter through applied mathematical correlation equations.

Process IR-06:

To determine, define, and describe the Inviter's SHOUT scores 126 and 138; the program immediately collates, parses, and stores all 5 levels of the IR data input. The program measures the overall quantitative data against the Perfect 5.0 (P5) benchmark as well as any previous IR data sets (responses 122) and Self-Rated (SR) data sets (responses 114). The program stores IR data for continuing correlation with future IR data input. The program parses and stores IR data according to the 5 categories, as well as Relationship Level (RL) variables (level 146), Length of Use (LU) variables (time periods 162), and Publication—Open Book/Half Book/Closed Book (OB/HB/CB) variables (166 described below). These variables are further described above and below.

In an example embodiment, apparatus 100 provides surety score or level 168, which is an indication of the confidence level of some or all of scores 118, 126, and 138. The surety level is based on the number of responses 122, the openness or transparency of the first user (access granted by the first user), and the amount of time the first user has been using apparatus 100. Number 160 is selected by the processor according to the number of responses 122 received. In an example embodiment, number of responses 122 received is 10 and number 160 is 0.45 It should be understood that the number of responses 122 and numbers 160 are not limited to any particular values.

In an example embodiment, a length of use time period 162 is less than one year and a number 164 is 0.45. It should be understood that time periods 162 and numbers 164 are not limited to any particular values.

The following provides further detail regarding the access process described above and number 166. In an example embodiment, the program offers Inviter-Users and Invitee-Users to periodically withdraw, hide, or revise any SHOUT rating and withdraw any Invitee-User, for example, at annual 12 month intervals from date of SHOUT submission (responses 114 and 122)—with explanation. That is, the person being evaluated can control the level of access that others have to responses 114 and 122. In an example embodiment, the program allows a specified period of time for the person being evaluated to take this action or rating remains until the following annual interval date at which time hiding and withdrawing is allowed again within a specified period of time. The program recognizes and accounts for personal changes over time that may include increases or decreases in overall and specific character ratings as a result of maturation or other human behavior changes. If a person being evaluated chooses to remove or hide a rating, the program modifies the Publication Level (PL) category and applies that category's Descriptive—Open Book (OB), Half Book (HB), Closed Book (CB)—as well as that category's proportional rating impact to the hiding or withdrawing person. It should be understood that number 166 is not limited to any particular value.

The following provides further detail regarding outside review scores 126 and 138 for an entity. Because apparatus 100 obtains, evaluates, manages, provides understanding of, and applies human character traits, the various data described above can be aggregated and extrapolated to obtain, evaluate, manage, provide understanding of, and applied to entities or organizations which are comprised of one or more of the persons being evaluated. By aggregating the individual scores of an organization's participating individuals, the organization's character can be obtained, evaluated, rated, managed, understood, and applied. An organization's SHOUT scores can be parsed according to categories and descriptions just as an individual's SHOUT scores can be parsed and described, for example, as discussed above for the SR and IR processes. Furthermore, organizational character ratings can be parsed according to sub-groupings of the persons included in the entity, for example, Individual, Team, Division, Corporate, and Regional classifications as well as other specified classifications.

In an example embodiment, the periodic process of reviewing of scores and ratings, described above, is applied to organizations in the same manner as applied to individual persons, since an organization is comprised of participating persons. Organizations can have combined scores attributed to the entity as a whole, as well as have scores added and removed according to the same standards applied to individual persons. In an example embodiment, organizations have the option to manage scores and data through a specified representative or allow scores and data to be managed through participating individuals.

In an example embodiment, organizations can further have scores and data placed in "Current" or "Retired" classifications according to participating individuals' employment status. In general, the discussion above and below regarding individuals and apparatus 100 is applicable to organizations and apparatus 100. For example, relationship Levels, Anniversary Levels, Length of Use Levels, and Publication Levels apply to organizations as they do to individuals.

Figure 2:

FIGS. 2-11 include example screen captures illustrating computer-based apparatus 100 and a method for compiling and evaluating character traits. FIG. 2 shows a screen presented to a first user upon accessing apparatus 100. The screen in FIG. 2 presents traits 112 and queries for evaluations 116. The figures also show scores 118, 120, and 121.

Figure 3:
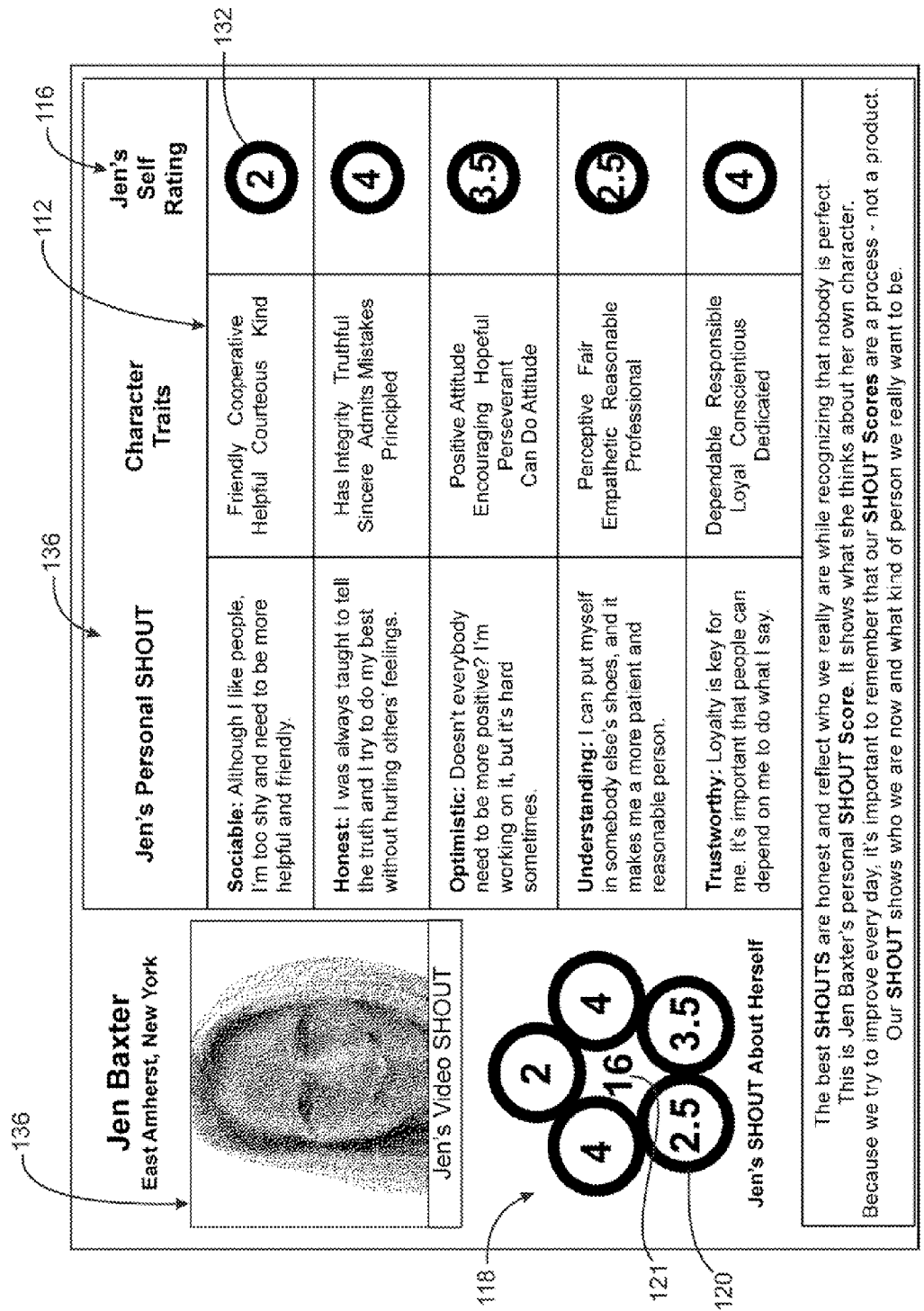

To generate the screen in FIG. 3, a first user, Jen Baxter, has provided evaluations 116 and inputs 136. In FIG. 3, inputs 136 include a video of Baxter. Scores 118, 120, and 121 have been generated as described above.

Figure 4:
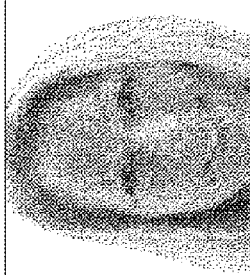

To generate the screen in FIG. 4, Baxter has sent query 110 to a second user. In screen 4, the second user is prompted to provide evaluations 124 of Baxter according to traits 112. Score 126 in FIG. 4 is an initial highest score of 25, which is modified by the reviewer, for example, as shown in the next figure.

Figure 5:
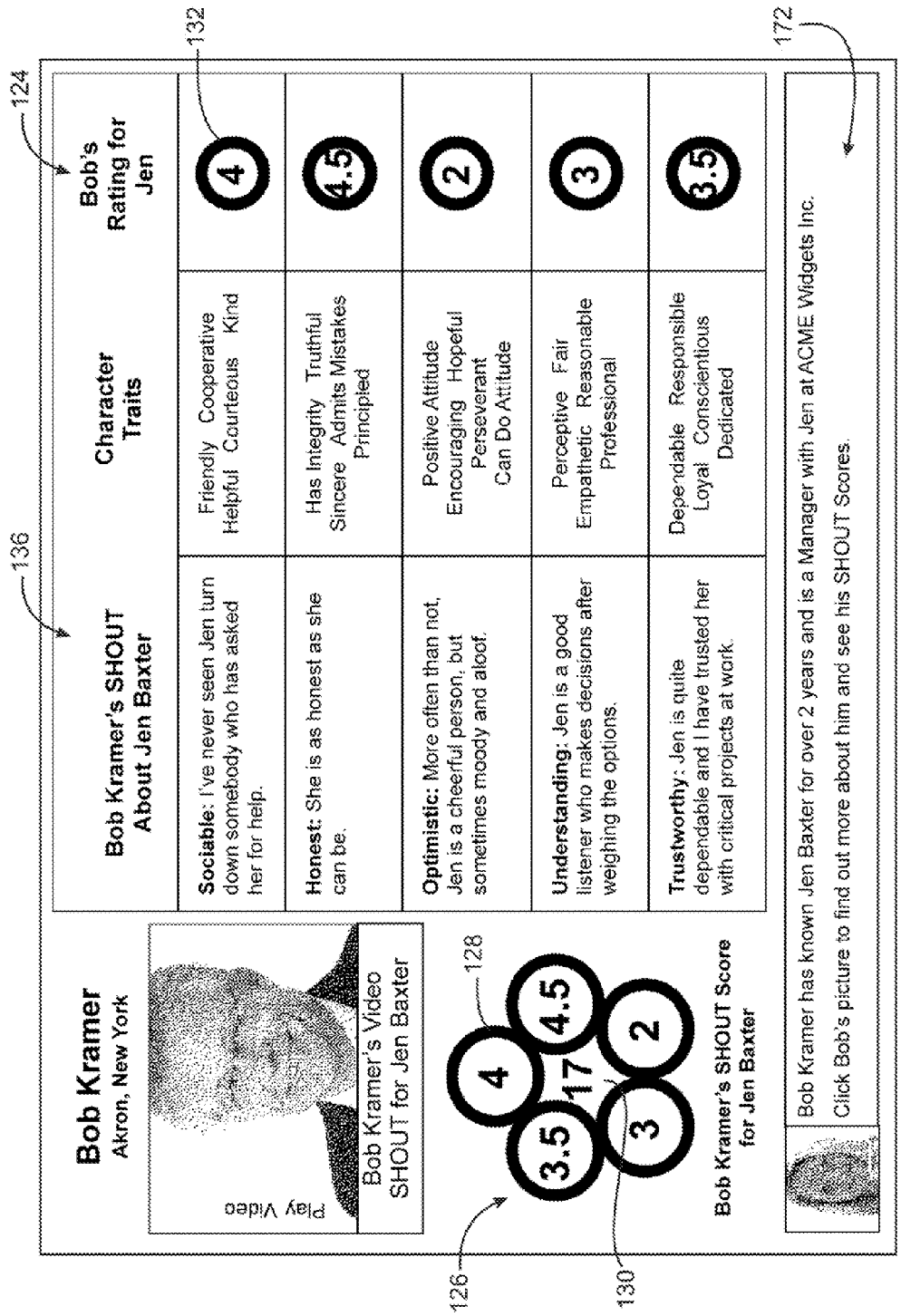

To generate the screen in FIG. 5, a second user, Bob Kramer, using the screen shown in FIG. 4, has provided response 122 by providing evaluations 124 and inputs 136. Kramer's score 126 for Baxter has been generated as described above. In addition, Kramer has provided additional information 136 in field 172. In this case, the information includes information regarding Kramer's relationship with Baxter. From the information in field 172, Kramer's relationship with Baxter falls under example category RL-02.

Figure 6:
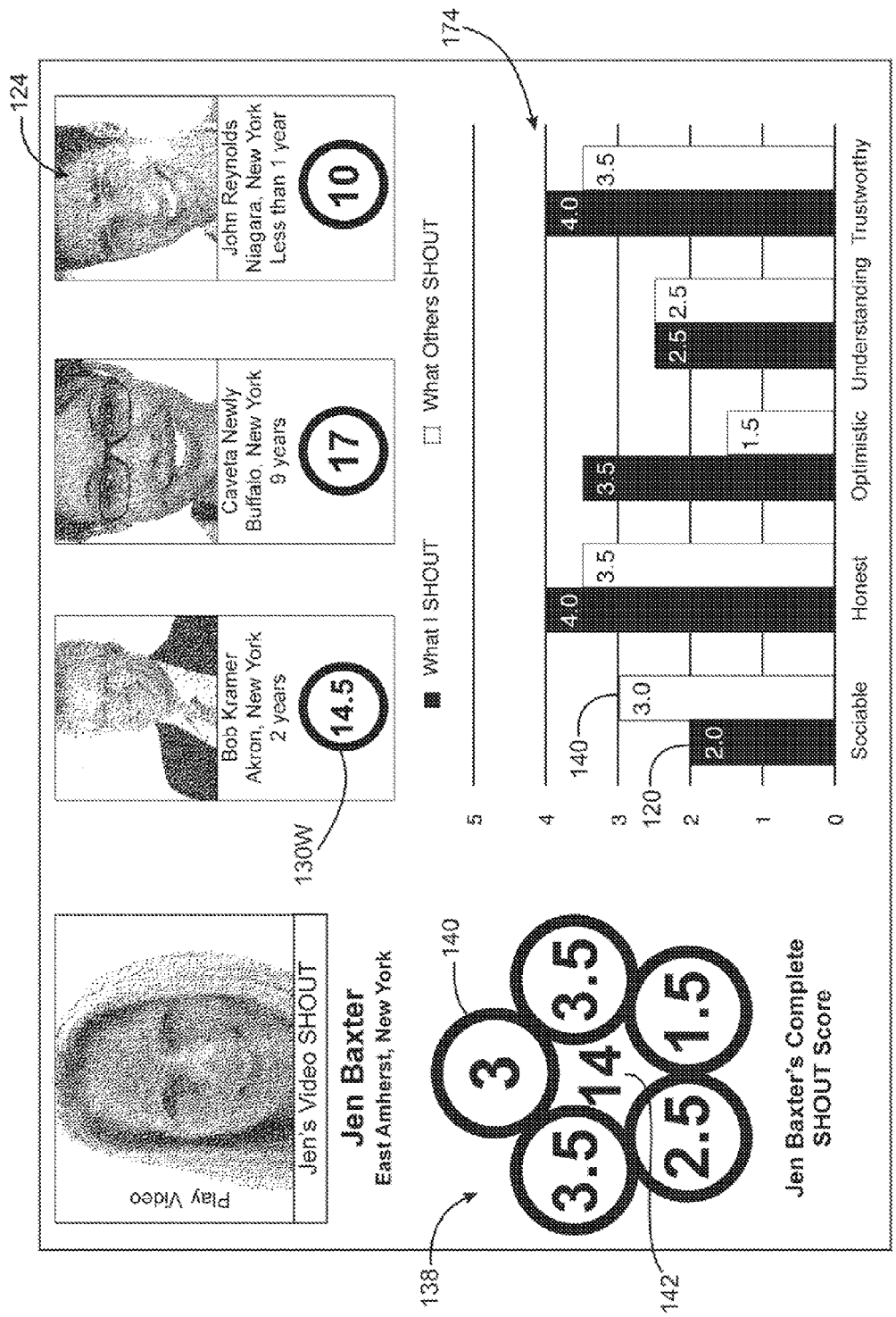

To generate the screen in FIG. 6, Baxter's account has been accessed. In this example, Baxter's account is in the Open Book mode described above and respective scores 130W are shown for the second users displayed (Kramer, Newly, and Reynolds). Composite scores 138, 140, and 142 have been generated as described above. Histogram 174 shows the relationship of scores 120 and 140.

Figure 7:
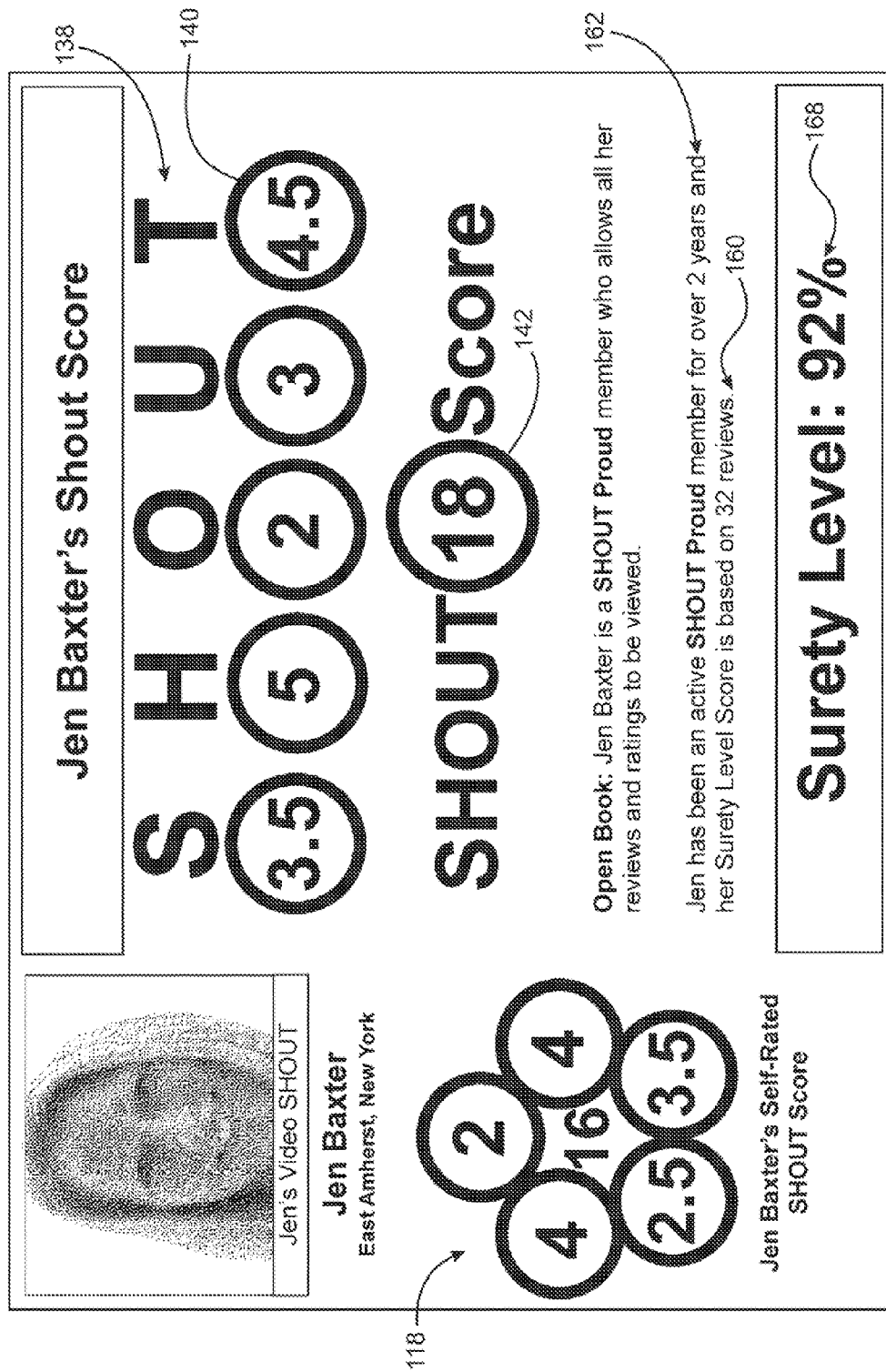

The screen in FIG. 7 shows Baxter's score 118 and scores 138, 140, and 142 generated as described above. The screen also shows that Baxter's account is in the Open Book mode described above. The screen further shows length of use time period 162, number of responses 160, and surety score 168 generated as described above. As described above, scores are weighted according to the openness of Baxter's account (number 166), time period 162, and number of responses 160. The surety score has been described above.

The screen in FIG. 8 shows the process for updating responses from second users. A second user with respect to Jen Baxter, Caveta Newly, has been sent the screen in FIG. 8 with her previous evaluations 124 shown in field 176. Based on changes that Newly may have made to the previous evaluations, a new score 126 is displayed. In addition, score 126 has been weighted by a shift to an anniversary level 154, in this case silver, which per the example described above, weights Newly's scores by a predetermined multiplier.

Figure 9:
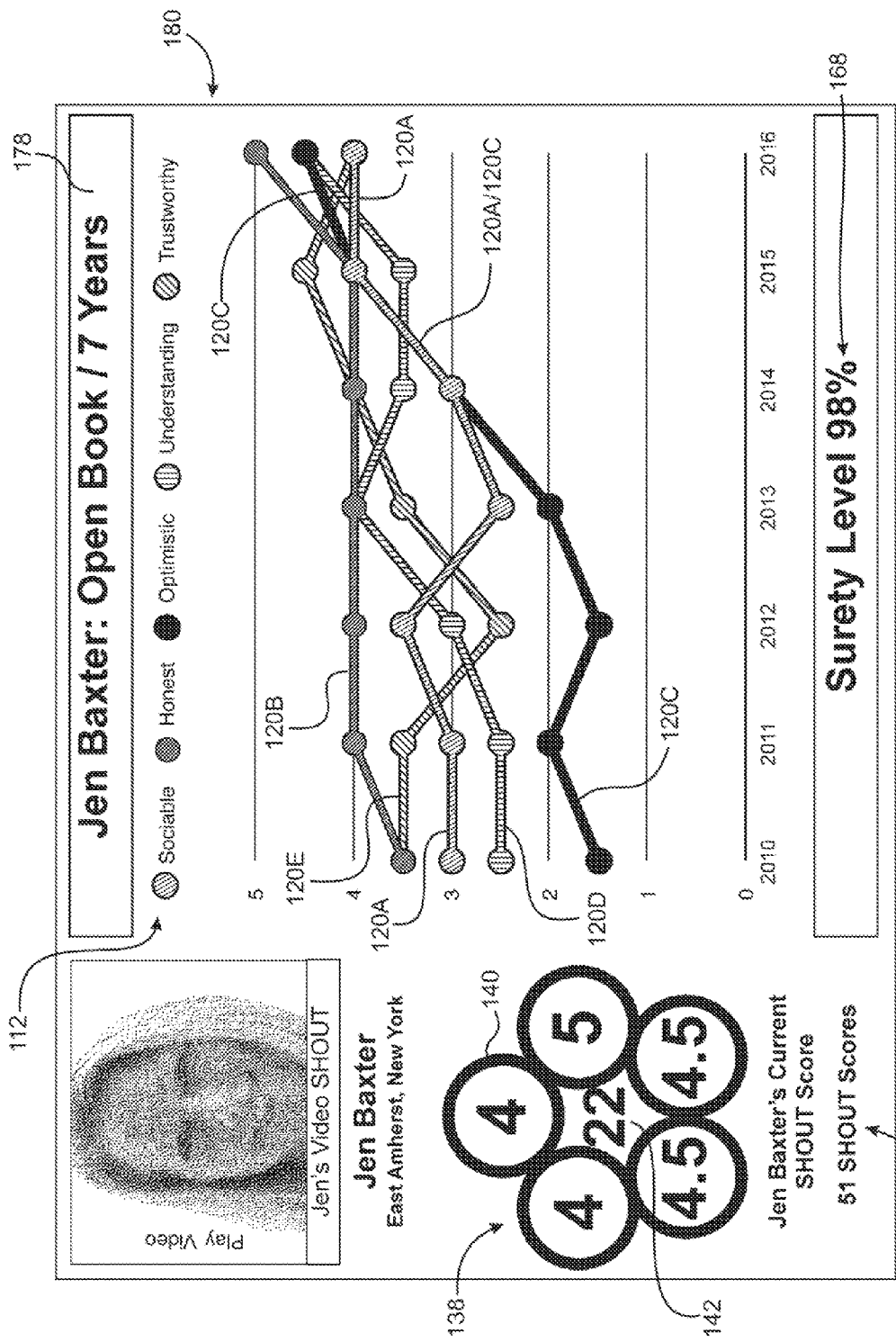

The screen in FIG. 9 shows a summary of Baxter's scores and changes in traits 112 for example, as first displayed in score 138 from FIG. 6, at a future date, in this case, seven years since opening her account. As shown in field 178, Baxter's account is in the Open Book mode and Baxter's account has been in operation for seven years. Graph 180 plots the changes in traits 112 across the seven years of operation. Numerals 120A-E designate scores 120 for traits 112: sociable, honest, optimistic, understanding, and trustworthy, respectively. The number of responses 122 and the surety level also are shown.

Figure 10:
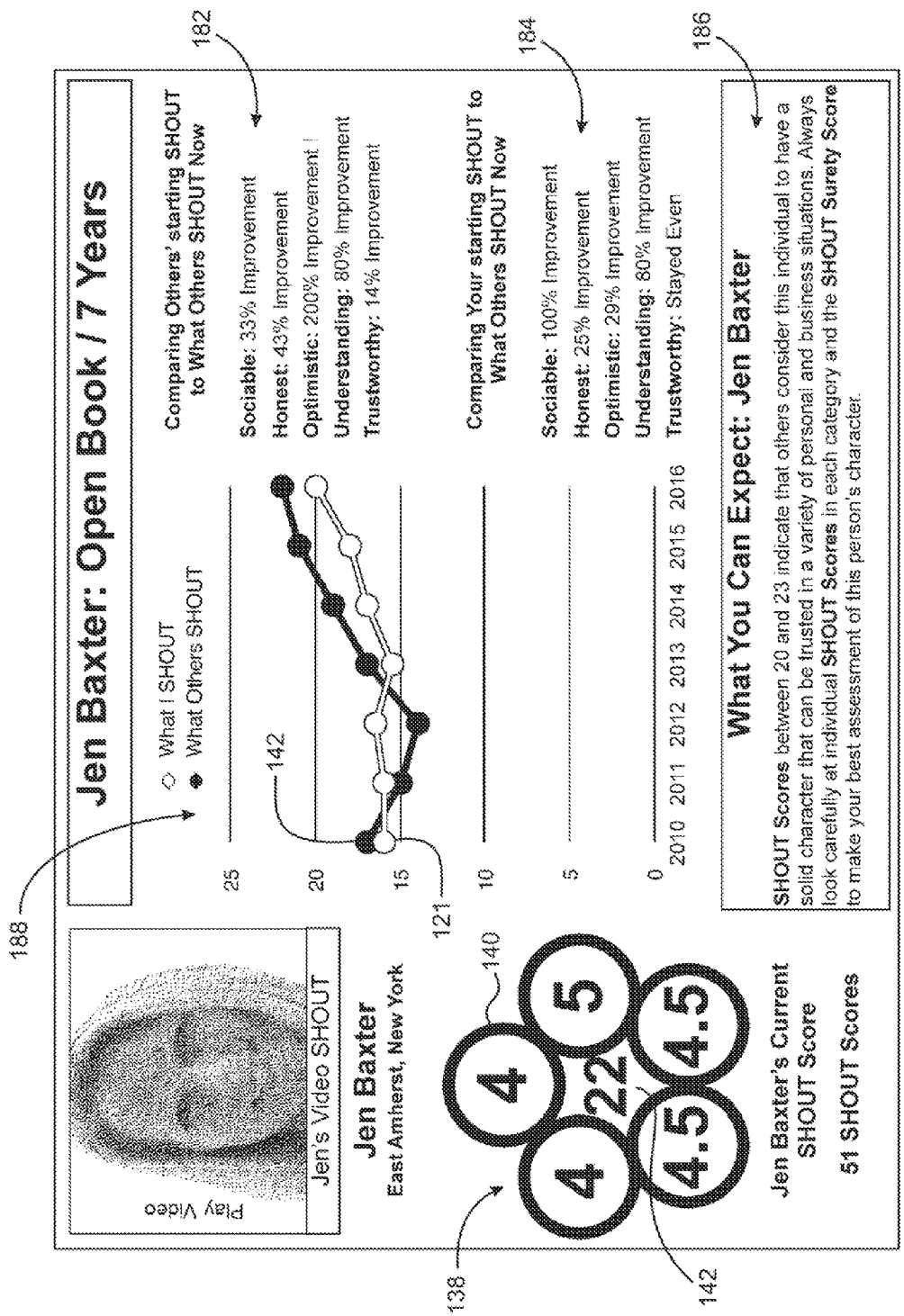

The screen in FIG. 10 follows the screen in FIG. 9 and tracks the changes in self-score 121 and composite score 142 for Baxter. Field 182 summarizes changes in scores 140 for Baxter. Field 184 compares the starting score 120 for Baxter with the current score 140. Field 186 shows "What You Can Expect." For example, in field 186, apparatus 100 generates a graded evaluation, based on score 138, providing informative guidelines for interpreting scores. Graph 188 plots scores 121 and 142 over the period from 2010 to 2016.

Figure 11:
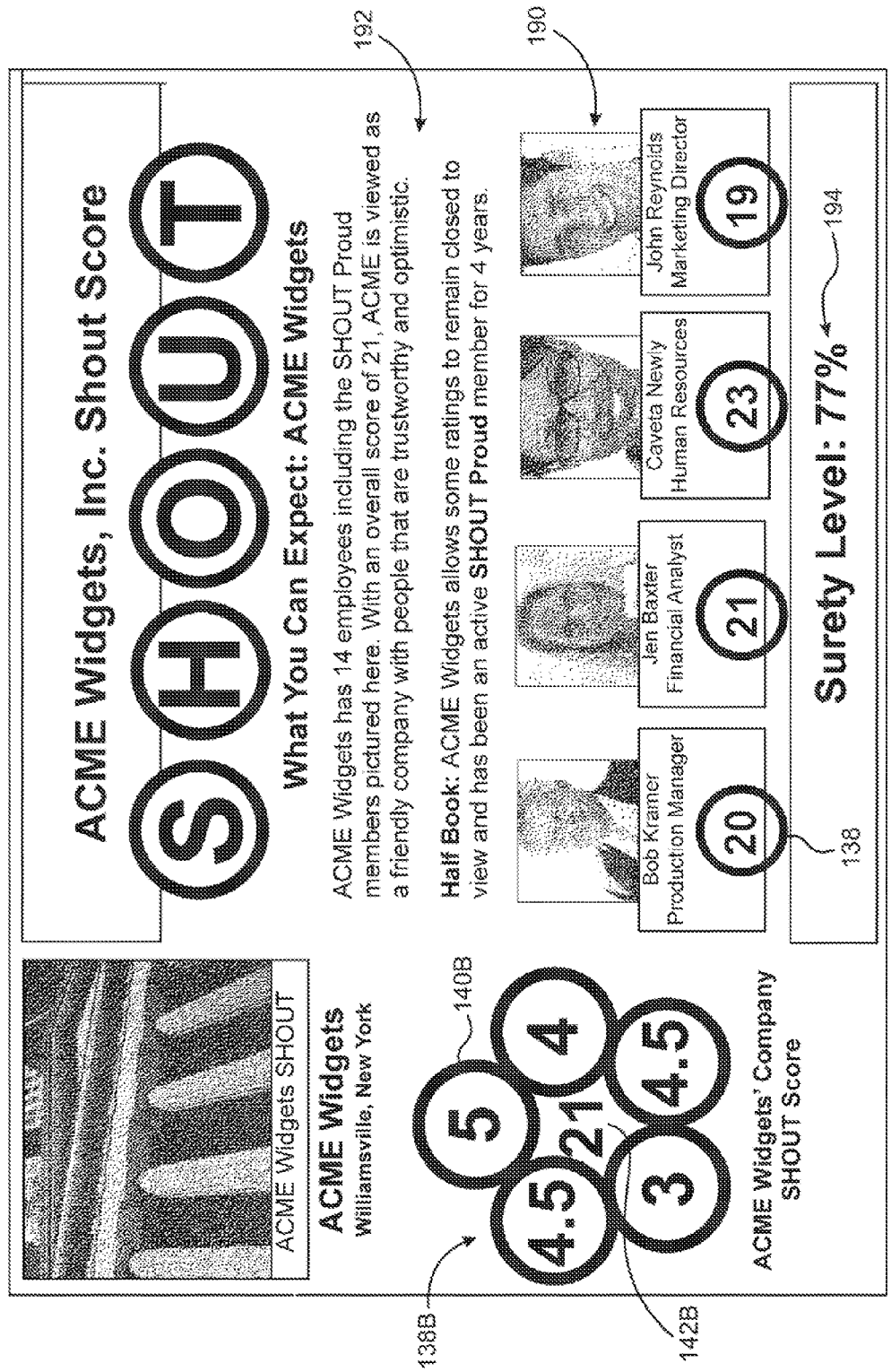

The screen in FIG. 11 shows an outside evaluation for a business entity, ACME Widgets, Inc. A plurality of first users associated with ACME is shown in field 190. Individual scores 138 are shown below each user in field 190. Organization outside review score 138B including respective organization scores 140B for each character trait, and organization outside overall score 142B, described above, also is shown. ACME operates in the Half Book mode. Field 192, What You Can Expect, provides an interpretation of the entity scores and informs the reader of the Half Book mode and length of use (four years). The surety score is shown in field 194. Due to Acme operating in Half Book mode, the score has been lowered.

In one embodiment, the first user, for example, Baxter, is part of an organization, although this fact may not be known by the second user at the time that the second user provides an evaluation of the first user. The evaluation of the first user by the second user can be added to the review of the organization, for example, to generate the outside review score 138B. In one embodiment, a third party or an organization initiates a review process by sending inquiries to potential second users identifying the persons to be evaluated as members of the organization.

In an example embodiment, after a profile is set up by a SHOUT Proud Client User (first user), the program offers the Client User the option of creating a link or icon that could be used in any correspondence or advertising in which to direct a Public Viewer to the Client User's profile. With so many common surnames, this process can ensure that the specific Public Viewer is looking at the correct Client User's profile. The program also has an authentication code to provide a Public Viewer with verification that the person they are communicating with is actually who they say they are.

The following provides further example detail regarding the verification process:

Verification Process 01:

The program displays the following message to the Client User, "Would you like to add a link or icon to direct people to your profile?" If the Client User responds "yes," then the program displays a link or icon that can be copied by the Client User, or offers the option for the Client User to upload their own personal logo or icon.

The program then displays the following message to the Client User, "Would you like to add an authentication code that verifies that the profile is actually your profile?" If the Client User enters "no," then the program returns to the profile. If the Client User enters "yes" the program displays the message, "Please enter at least seven or more letters, numbers, or combination of such to create your personal authentication code." Once an authentication code is entered, the program displays, "Now, when someone enters your personal identification code, "Profile Ownership Verified" will appear to that person.

Verification Process 02:

When a Public Viewer clicks on the SHOUT Proud generated link or icon that a Client User has placed in correspondence or advertising, the Public Viewer is directed to the Client User's profile on the Shout Proud website.

On the main page of the Client User's profile the program offers a tab that asks, "Do you want to verify the owner of this SHOUT Proud profile?" When the Public Viewer selects this option, the program displays the message, "Do you have an authentication code to verify the owner of this profile?" If the Public Viewer answers "yes," then the program displays the message, "Did you get an authentication code from the SHOUT Proud profile owner?" If the Public User enters "no," then the computer displays the message, "Please contact the profile owner for the authentication code." If the Public Viewer enters "yes," then the program directs the Public Viewer to input the authentication code given to them by the Client User. Once the Public viewer inputs the same authentication code that the Client User has set up, the program displays the message, "Profile Ownership Verified." The program then returns the Public User to the verified Client User's profile.

It should be understood that various storage and removal operations, not explicitly described above, involving memory 106 and as known in the art, are possible with respect to the operation of system 100. For example, outputs from and inputs to the general-purpose computer can be stored and retrieved from the memory elements and data generated by the processor can be stored in and retrieved from the memory.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-based method for compiling and evaluating character traits, comprising:
   transmitting, using at least one processor for at least one specially programmed computer, a plurality of queries regarding a plurality of character traits;
   receiving, using the at least one processor, a first response, from a first user, to the plurality of queries, the first response including a respective first evaluation, by the first user, of the first user with respect to each character trait in the plurality of character traits;
   generating, using the at least one processor and the first response, a self-rating score including a respective first score for said each character trait and a self-rating overall score representing all the character traits;
   transmitting, using the at least one processor, the plurality of queries to a second user other than the first user;
   receiving, from the second user and using the at least one processor, a second response to the plurality of queries, the second response including a respective second evaluation, by the second user, of the first user with respect to said each character trait;
   generating, using the at least one processor and the second response, an outside review score including a respective second score for said each character trait, and an outside overall score representing all the character traits;
   receiving, using the at least one processor, a first relationship level selected by the first user from a plurality of relationship levels identifying respective lengths of acquaintance between the first and second users;
   transmitting, using the at least one processor, the self-rating score and the outside review score; and,
   displaying, using at least one graphical user interface, the self-rating score and the outside review score, wherein:
      the plurality of queries transmitted to the second user includes the plurality of relationship levels;
      receiving the second response includes receiving a second relationship level selected by the second user from the plurality of relationship levels; and,
      generating the outside review score includes weighting, using the first or second selected relationship level, the second respective scores or the outside overall score.

2. The method of claim 1 further comprising:
   receiving, using the at least one processor and after receiving the first response, a third response from the first user to the plurality of queries, the third response including a respective third evaluation, by the first user, of the first user with respect to said each character trait;
   generating, using the at least one processor, an updated self-rating score by modifying the respective first scores or the self-rating score according to the third response;
   transmitting, using the at least one processor, the updated self-rating score; and,
   displaying, using the at least one graphical user interface, the updated self-rating score.

3. The method of claim 1 wherein:
   the plurality of queries includes a range of numbers for each character trait in the plurality of character traits;
   the first and second response include, for said each character trait, a respective selected number from the respective range of numbers;
   the first and second responses include, for said each character trait, respective inputs for at least one character trait from the plurality of character traits;
   displaying the self-rating score includes displaying the respective inputs and the respective selected numbers for the first response; and,
   displaying the outside review score includes displaying the respective inputs and the respective selected numbers for the second response.

4. The method of claim 1, wherein:
   a respective range of numbers is assigned to each character trait in the plurality of character traits;
   receiving the second response includes receiving respective selected numbers from the respective ranges of numbers; and,
   weighting the second respective scores or the outside overall score includes multiplying the second respective scores or the outside overall score by a number associated with the selected relationship level.

5. The method of claim 1, further comprising:
   transmitting, after expiration of a time period from the receipt of the second response and using the at least one processor, respective requests to the first and second users to select a second relationship level from the plurality of relationship levels, different from the first selected relationship level, according to a change in the length of acquaintance between the first and second users, due to the expired time period; and,
   receiving, using the at least one processor, a respective second selected relationship level from the first or second user, wherein weighting the second respective scores or the outside overall score includes multiplying the second respective scores or the outside overall score by a number associated with the second selected relationship level.

6. The method of claim 1 further comprising:
   receiving, from a plurality of second users other than the first user, and using the at least one processor, a plurality of second response to the plurality of queries, each second response including a respective second evaluation, by a respective second user, of the first user with respect to said each character trait;
   generating, using the at least one processor and the plurality of second responses, a composite outside review score including a respective composite score for said each character trait, and a composite outside overall score representing all the character traits;
   transmitting, using the at least one processor, the composite outside review score; and,
   displaying, using the at least one graphical user interface, the composite outside review score.

7. The method of claim 1, wherein the first user is associated with an organization, the method further comprising:
   generating, using the at least one processor and the outside review score, an organization outside review score including a respective third score for said each character trait and a organization outside overall score representing all the character traits;
   transmitting, using the at least one processor, the organization outside review score; and,
   displaying, using the at least one graphical user interface, the organization outside review score.

8. The method of claim 1, further comprising:
   transmitting, using the at least one processor, the plurality of queries to at least one third user;
   receiving, from the at least one third user and using the at least one processor, at least one third response to the plurality of queries, the at least one third response including respective third evaluations, by the at least one third user, of at least one person, associated with an organization, with respect to said each character trait;

generating, using the at least one processor and the at least one third response, an organization outside review score including a respective third score for said each character trait, and a organization outside overall score representing all the character traits;

transmitting, using the at least one processor, the organization outside review score; and, displaying, using the at least one graphical user interface, the organization outside review score.

9. The method of claim 1 further comprising:

receiving, from a plurality of second users other than the first user, and using the at least one processor, a plurality of second response to the plurality of queries, each second response including a respective second evaluation, by a respective second user, of the first user with respect to said each character trait;

generating, using the at least one processor and the plurality of second responses, a composite outside review score including a respective composite score for said each character trait, and a composite outside overall score representing all the character traits; and, selecting, using the at least one processor, a first number, from a first range of numbers, according to a number of responses in the plurality of second responses;

selecting, using the at least one processor, a length of use time period for the first user, from a plurality of length of use time periods, based on a time duration since receipt of the first response;

selecting, using the at least one processor, a second number associated with the selected length of use time period;

providing access, in response to input received by the at least one processor from the first user and using the at least one processor, to users other than the first user to the plurality of second responses, the access ranging from access to all the plurality of second response to access to a limited number of the plurality of second responses;

selecting, using the at least one processor, a third number according the access provided;

generating, using the at least one processor, a surety score representing a confidence level in the composite outside review score by multiplying together the first, second, and third numbers transmitting, using the at least one processor, the surety score; and, displaying, using the at least one graphical user interface, the surety score.

10. A computer-based apparatus for compiling and evaluating character traits, comprising:

at least one processor for at least one specially programmed computer arranged to:

transmit a plurality of queries regarding a plurality of character traits;

receive a first response, from a first user, to the plurality of queries, the first response including a respective first evaluation, by the first user, of the first user with respect to each character trait in the plurality of character traits;

generate, using the first response, a self-rating score including a respective first score for said each character trait and a self-rating overall score representing all the character traits;

transmit the plurality of queries to a second user other than the first user;

receive, from the second user, a second response to the plurality of queries, the second response including a respective second evaluation, by the second user, of the first user with respect to said each character trait;

generate, using the second response, an outside review score including a respective second score for said each character trait, and an outside overall score representing all the character traits;

receive a first relationship level selected by the first user from a plurality of relationship levels identifying respective lengths of acquaintance between the first and second users; and, transmit the self-rating score and the outside review score for display by at least one graphical user interface, wherein:

the plurality of queries transmitted to the second user includes the plurality of relationship levels;

receiving the second response includes receiving a second relationship level selected by the second user from the plurality of relationship levels; and, generating the outside review score includes weighting, using the first or second selected relationship level, the second respective scores or the outside overall score.

11. The apparatus of claim 10 wherein:

the at least one processor is arranged to:

receive a third response, after receiving the first response, from the first user to the plurality of queries, the third response including a respective third evaluation, by the first user, of the first user with respect to said each character trait;

generate an updated self-rating score by modifying the respective first scores or the self-rating score according to the third response; and, transmit the updated self-rating for display by the at least one graphical user interface.

12. The apparatus of claim 10 wherein:

the plurality of queries includes a respective range of numbers for each character trait in the plurality of character traits;

the first and second response include, for said each character trait, a respective selected number from the respective range of numbers;

the first and second responses include, for said each character trait, respective inputs for at least one character trait from the plurality of character traits;

transmitting the self-rating score includes transmitting the respective inputs and the respective selected numbers for the first response; and, transmitting the outside review score includes transmitting the respective inputs and the respective selected numbers for the second response.

13. The apparatus of claim 10, wherein:

a respective range of numbers is assigned to each character trait in the plurality of character traits;

receiving the second response includes receiving respective selected numbers from the respective ranges of numbers; and, weighting the second respective scores or the outside overall score includes multiplying the second respective scores or the outside overall score by a number associated with the selected relationship level.

14. The apparatus of claim 10, wherein the at least one processor is arranged to:
  receive, from a plurality of second users other than the first user, a plurality of second response to the plurality of queries, each second response including a respective second evaluation, by a respective second user, of the first user with respect to said each character trait;
  generate, using the plurality of second responses, a composite outside review score including a respective composite score for said each character trait and a composite outside overall score representing all the character traits; and,
  transmit the composite outside review score for display by the at least one graphical user interface.

15. The apparatus of claim 10, wherein:
  the first user is associated with an organization;
  the at least one processor is arranged to:
    generate, using the outside review score, an organization outside review score including a respective third score for said each character trait, and a organization outside overall score representing all the character traits; and,
    transmit the organization outside review score; and,
  the at least one graphical user interface is arranged to display the organization outside review score.

16. The apparatus of claim 10, wherein:
  the at least one processor is arranged to:
    transmit the plurality of queries to at least one third user;
    receive, from the at least one third user, at least one third response to the plurality of queries, the at least one third response including respective third evaluations, by the at least one third user, of at least one person, associated with an organization, with respect to said each character trait;
    generate, using the at least one third response, an organization outside review score including a respective third score for said each character trait, and a organization outside overall score representing all the character traits; and,
    transmit the organization outside review score; and,
  the at least one graphical user interface is arranged to display the organization outside review score.

17. The apparatus of claim 10 wherein the at least one processor is arranged to:
  receive, from a plurality of second users other than the first user, a plurality of second response to the plurality of queries, each second response including a respective second evaluation, by a respective second user, of the first user with respect to said each character trait;
  generate, using the plurality of second responses, a composite outside review score including a respective composite score for said each character trait, and a composite outside overall score representing all the character traits;
  select a first number, from a first range of numbers, according to a number of responses in the plurality of second responses;
  select a length of use time period for the first user, from a plurality of length of use time periods, based on a time duration since receipt of the first response;
  select a second number associated with the selected length of use time period;
  provide, in response to input received from the first user, access to users other than the first user to the plurality of second responses, the access ranging from access to all the second response to access to a limited number of the second responses;
  select a third number according the access provided;
  generate a surety score representing a confidence level in the composite outside review score by multiplying together the first, second, and third numbers; and,
  transmit the surety score for display by the at least one graphical user interface.

18. A computer-based method for compiling and evaluating character traits, comprising:
  transmitting, using at least one processor for at least one specially programmed computer, a plurality of queries regarding a plurality of character traits;
  receiving, using the at least one processor, a first response, from a first user, to the plurality of queries, the first response including a respective first evaluation, by the first user, of the first user with respect to each character trait in the plurality of character traits;
  generating, using the at least one processor and the first response, a self-rating score including a respective first score for said each character trait and a self-rating overall score representing all the character traits;
  transmitting, using the at least one processor, the self-rating score;
  displaying, using at least one graphical user interface, the self-rating score;
  receiving, using the at least one processor, a first relationship level selected by the first user from a plurality of relationship levels identifying respective lengths of acquaintance between the first user and a second user;
  transmitting, using the at least one processor, the plurality of queries and the plurality of relationship levels to a second user other than the first user;
  receiving, using the at least one processor and from the second user, a second response to the plurality of queries, the second response including:
    a respective second evaluation, by the second user, of the first user with respect to said each character trait; and,
    a second relationship level selected by the second user from the plurality of relationship levels;
  generating, using the at least one processor and the second response, an outside review score including a respective second score for said each character trait, and an outside overall score representing all the character traits;
  weighting, using the at least one processor and the first or second selected relationship level, the outside review score;
  transmitting, using the at least one processor, the weighted outside review score for display by the at least one graphical user interface;
  receiving, using the at least one processor, a third response, after receiving the first response, from the first user to the plurality of queries, the third response including a respective third evaluation, by the first user, of the first user with respect to said each character trait;
  generating, using the at least one processor, an updated self-rating score by modifying the respective first scores or the self-rating score according to the third response;
  transmitting, using the at least one processor, the updated self-rating for display by the at least one graphical user interface;
  receiving, using the at least one processor and from a plurality of second users other than the first user, a plurality of second response to the plurality of queries, each second response including a respective second evaluation, by a respective second user, of the first user with respect to said each character trait;
  generating, using the at least one processor and the plurality of second responses, a composite outside review score including a respective composite score for said each character trait, and a composite outside overall score representing all the character traits;

transmitting, using the at least one processor, the composite outside review score for display by the at least one graphical user interface;

selecting, using the at least one processor, a first number, from a first range of numbers, according to a number of responses in the plurality of second responses;

selecting, using the at least one processor, a length of use time period for the first user, from a plurality of length of use time periods, based on a time duration since receipt of the first response;

selecting, using the at least one processor, a second number associated with the selected length of use time period;

providing, in response to input received from the first user and using the at least one processor, access to users other than the first user to the plurality of second responses, the access ranging from access to all the second responses to access to a limited number of the second responses;

selecting, using the at least one processor, a third number according the access provided;

generating, using the at least one processor, a surety score representing a confidence level in the composite outside review score by multiplying together the first, second, and third numbers; and, transmitting, using the at least one processor, the surety score for display by the at least one graphical user interface.

* * * * *